UNITED STATES PATENT OFFICE.

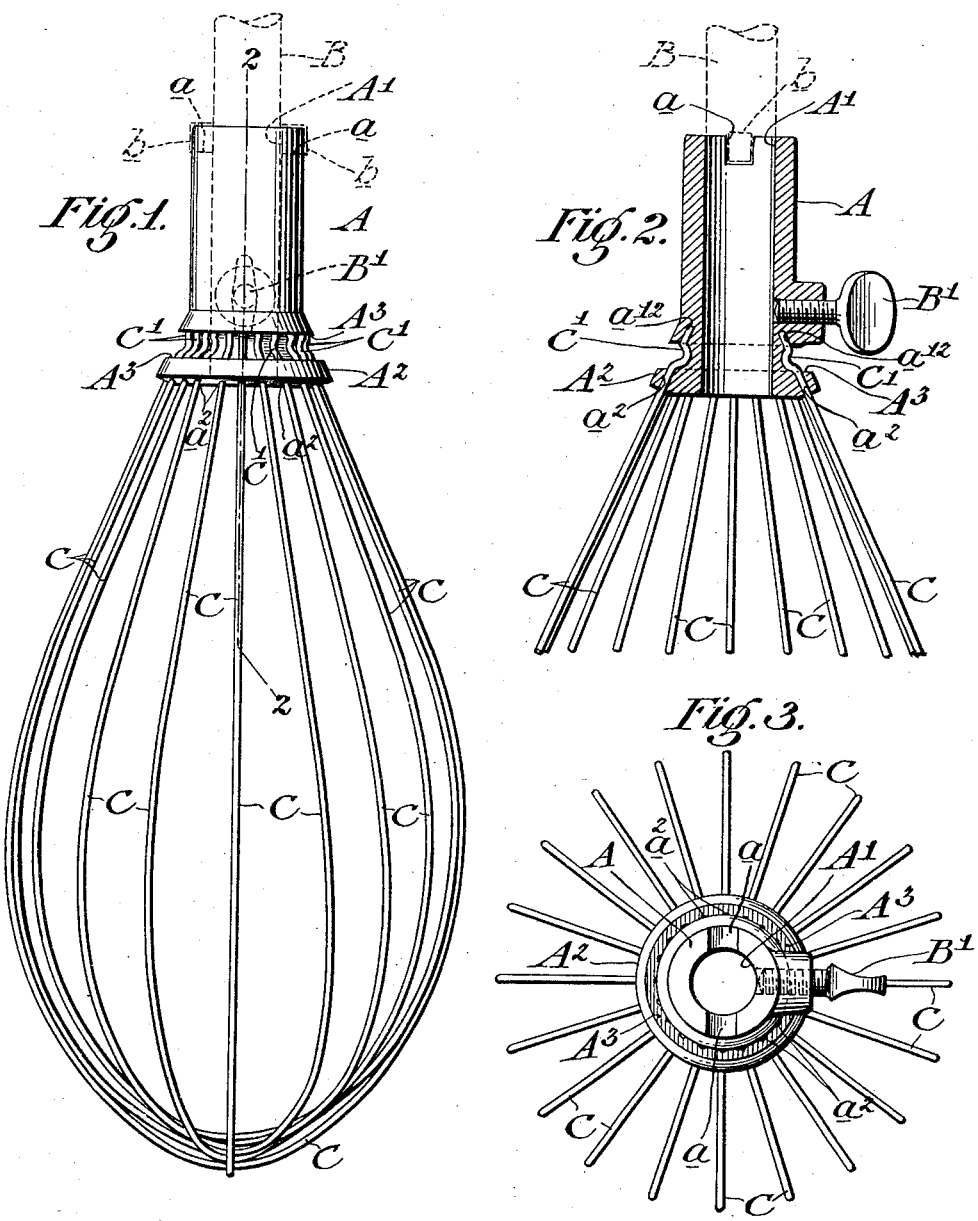

HARRY READ, OF YORK, PENNSYLVANIA.

BEATER FOR MIXING-MACHINES.

1,007,891. Specification of Letters Patent. Patented Nov. 7, 1911.

Application filed October 4, 1910. Serial No. 585,173.

*To all whom it may concern:*

Be it known that I, HARRY READ, a citizen of the United States, residing at York, in the county of York and State of Pennsylvania, have invented certain new and useful Improvements in Beaters for Mixing-Machines, of which the following is a specification.

My present invention relates to the construction of whips or beaters for mixing machines of the type disclosed in the application for a patent filed by me on January 14th, 1909, Serial No. 472,290 and allowed July 1st, 1910.

The object of the present invention is to provide a device of simple and durable construction and one having flexible or yielding members so disposed and arranged as to give way under tension and thereby not to become distorted in use.

The features of novelty embodied in my invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which my invention may be incorporated.

In the drawings: Figure 1 illustrates a front elevation of a whip or beater constructed according to the present invention, Fig. 2 represents a vertical section of the same, taken on the line 2—2 of Fig. 1, and Fig. 3 denotes a plan view.

As illustrated in the drawings, A represents the shank of the beater, constructed in the form of a sleeve, the central opening A' of which is adapted to receive a vertically disposed driving shaft of a mixing machine. The upper part of the shank A is slotted as shown at $a$, $a$, to engage lugs $b$, $b$, on the driving shaft B, as indicated by dotted lines, by which means the beater is caused to engage and turn with the shaft, and the lower part of the shank has a thumb-screw B' for holding the beater in position. The lower part of the shank is also provided with a flanged or enlarged portion $A^2$, having a circular series of holes $a^2$ drilled through the flange and well into the shank, for the reception of the free ends of the beating members, and with a groove $A^3$ located between the flange and the body of said shank.

The whips or beating members C are formed of flexible rods bent or folded to form loops, each loop crossing the path of the adjacent loop, and being held in position by the ends of the rods entering the holes $a^2$. In order to secure the beating members in position the ends thereof, after passing through the holes $a^2$ in the enlarged or flanged portion of the shank, enter similar holes in the body, which form continuations of the holes $a^2$ and are indicated at $a^{12}$. By this arrangement the free ends of the beating members are caused to bridge the groove $A^3$, and by the action of suitable dies they are upset or bent into said groove, as shown at C', thus forming a simple and permanent means for securing the beating members in position.

While, in accordance with the provisions of the statutes, I have herein described and illustrated the best form of my invention now known to me, it will be readily apparent to those skilled in the art that changes may be made in the form of my invention, without departing from the spirit thereof.

Having now described my invention, what I claim as new, and desire to secure by Letters Patent, is:

1. A beater for mixing machines, comprising a shank provided with an opening to engage a driving shaft, as also a circular series of holes to receive the ends of beating members, together with a peripheral groove intercepting said holes, and a series of flexible beating members disposed in the form of loops having their ends upset into said groove to form a permanent means for securing the members in position.

2. A beater for mixing machines, comprising a shank provided with a central opening to receive a driving shaft and a flanged portion having a circular series of openings for the reception of beating members together with a groove $A^3$, which intercepts said openings between the body of the shank and the flanged portion thereof, and a series of flexible rods constituting beating members disposed in the form of loops, the
5 ends of which are upset into the groove at a point C', for the purpose of securing the members firmly in position.

In testimony whereof I affix my signature in presence of two witnesses.

HARRY READ.

Witnesses:
O. R. READ,
LLOYD H. HERMAN.

Copies of this patent may be obtained for five cents each, by addressing the "Commissioner of Patents, Washington, D. C."